United States Patent
Peng et al.

(10) Patent No.: US 10,405,363 B2
(45) Date of Patent: Sep. 3, 2019

(54) D2D MODE B DISCOVERY SECURITY METHOD, TERMINAL AND SYSTEM, AND STORAGE MEDIUM

(71) Applicant: ZTE CORPORATION, Shenzhen, Guangdong Province (CN)

(72) Inventors: Jin Peng, Shenzhen (CN); Shilin You, Shenzhen (CN); Shuang Liang, Shenzhen (CN); Zhaoji Lin, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/542,081

(22) PCT Filed: Aug. 6, 2015

(86) PCT No.: PCT/CN2015/086231
§ 371 (c)(1),
(2) Date: Jul. 7, 2017

(87) PCT Pub. No.: WO2016/110093
PCT Pub. Date: Jul. 14, 2016

(65) Prior Publication Data
US 2018/0279394 A1    Sep. 27, 2018

(30) Foreign Application Priority Data
Jan. 9, 2015 (CN) .......................... 2015 1 0013226

(51) Int. Cl.
*H04W 8/00* (2009.01)
*H04W 12/10* (2009.01)
(Continued)

(52) U.S. Cl.
CPC .............. *H04W 76/14* (2018.02); *H04L 29/06* (2013.01); *H04L 63/123* (2013.01);
(Continued)

(58) Field of Classification Search
CPC ..... H04W 76/14; H04W 76/10; H04W 8/005; H04W 12/10; H04L 29/06; H04L 63/123
See application file for complete search history.

(56) References Cited

U.S. PATENT DOCUMENTS

2014/0344578 A1    11/2014 Kim et al.
2016/0302062 A1*   10/2016 Lehtovirta ............ H04W 76/10
2017/0164189 A1*    6/2017 Zhong ................... H04W 76/14

FOREIGN PATENT DOCUMENTS

CN    104066200 A    9/2014
CN    104168629 A    11/2014
WO    WO2014116083 A1    7/2014

OTHER PUBLICATIONS

3rd Generation Partnership Project; Technical Specification Group Services and System Aspects; Study on Security issues to support Proximity Services (ProSe) (Release 13); 3GPP TR 33.8833 V1.2.0 (Nov. 2014). XP50924217A.

(Continued)

Primary Examiner — Marisol Figueroa
(74) Attorney, Agent, or Firm — McDonald Hopkins LLC

(57) ABSTRACT

A security method for D2D mode B discovery is disclosed in the embodiments of the present disclosure, in four processes of the D2D mode B discovery service, integrity protection is performed, by adding corresponding parameters, on a discovery response message of a passive terminal, a discovery response message of an active terminal, a query request message sent by the active terminal to the passive terminal, a query response message sent by the passive terminal to the active terminal, and the matching report message of the active terminal. A security system, terminal for D2D mode B discovery and a storage medium are further disclosed in the embodiments of the present disclosure.

16 Claims, 11 Drawing Sheets

(51) Int. Cl.
*H04L 29/06* (2006.01)
*H04W 76/10* (2018.01)
*H04W 76/14* (2018.01)

(52) U.S. Cl.
CPC .......... *H04W 8/005* (2013.01); *H04W 12/10* (2013.01); *H04W 76/10* (2018.02)

(56) References Cited

OTHER PUBLICATIONS

3rd Generation Partnership Project; Technical Specification Group Services and System Aspects; Proximity-based Services (ProSe); Security aspects (Release 12); 3GPP TS 33.303 V122.0 (Dec. 2014). XP50927294A.

* cited by examiner

D2D MODE B DISCOVERY SECURITY METHOD, TERMINAL AND SYSTEM, AND STORAGE MEDIUM

TECHNICAL FIELD

The present disclosure relates to a mobile communication technology, in particular to a security method, terminal and system for Device-to-Device (D2D) mode B discovery, and a computer storage medium.

BACKGROUND

In order to maintain competitive capability of the third generation mobile communication system in the field of communication, provide users with faster speed, shorter delay, and more personalized mobile services, and meanwhile reduce the operator's operating costs, the 3rd Generation Partnership Project (3GPP for short) standards working group is working on the Evolved Packet system (EPS for short) research. The entire EPS includes an Evolved Universal Terrestrial Radio Access Network (E-UTRAN for short) and an Evolved Packet Core Networking (EPC for short), herein, the EPC includes a Home Subscriber Server (HSS for short), a Mobility Management Entity (MME for short), a Serving GPRS Support Node (SGSN for short), a Policy and Charging Rule Function (PCRF for short), a Serving Gateway (S-GW for short), a PDN Gateway (P-GW for short) and a Packet Data Network (PDN for short).

When two User Equipments (UE for short) communicate via an EPS, the two UEs need to establish bearer with the EPS, respectively. However, in view of the rapid development of the UE and various mobile Internet services, many services desire to find adjacent UEs and communicate, thus generating device-to-device (D2D) services, which are also referred to as Proximity-based Service (ProSe for short). In the D2D service, when the two UEs are relatively close, the two UEs may directly communicate with each other, a data path with which the two UEs are connected may not go back to a core network, thus, on one hand, an indirect data routing may be reduced, on the other hand, the network data load may also be reduced. Therefore, the D2D service has gotten attention of many operators.

At present, the conventional D2D services include a D2D discovery service, the communication architecture of which is shown in FIG. 1, two UEs which are accessed in D2D can only access an EPC via an E-UTRAN, both of the two UEs may belong to a Public Land Mobile Network (referred to as PLMN), or the two UEs may belong to two PLMNs separately; for one UE, the PLMN may be classified as a home PLMN (referred to as Home PLMN) or a Visited PLMN (referred to as VPLMN) which is visited by the UE when accessing from another PLMN, the PLMN in a region where the UE is located may be collectively referred to as the local PLMN (referred to as Local PLMN), no matter the local PLMN is HPLMN or VPLMN. In order to achieve the D2D discovery service, not only the EPS, but also a ProSe application server for the D2D discovery service are deployed at the operator side, and the ProSe application server can be provided by a service provider that operates the D2D service, or by a network operator that operates the EPS, and ProSe function entities are also deployed in different PLMNs. For two UEs for a ProSe service, one UE thereof acquires a service code for broadcast from the ProSe function entity after obtaining a service identifier from the ProSe function entity, and the UE is referred to as Announcing UE (A-UE for short). The other UE receives broadcast of the A-UE and then matches with the ProSe function entity of the UE, and performs the ProSe service with the A-UE if the matching is successful. This unannounced UE is referred to as a Monitoring UE (M-UE).

In a communication architecture of the D2D discovery service, because the UE provides a related ProSe application (APP for short), and an interface of the related ProSe APP with the ProSe application server is PC1 interface, a related authentication function is provided. The interface between the UEs is PC5 for direct discovery and communication with each other between the UEs, and the interfaces between the UEs and the ProSe function entities are PC3 for discovery authentication via the network. The interfaces between the ProSe function entities and the existing EPC are PC4s, which include a user plane interface with the P-GW and a control plane interface with the HSS, for discovery authentication for the D2D discovery service. The interface of the ProSe function entity with the ProSe application server is PC2, which is configured for implementation of the application of D2D discovery service. There are PC6 and PC7 interfaces between the ProSe function entities, respectively, which are configured for the case of roaming and the case of non-roaming, respectively, and the PC7 interface is used when the UE roams, and the PC6 interface is used for when the UE does not roam. The two interfaces are configured for performing information exchange between the two ProSe function entities when the UE performs the D2D discovery service.

The D2D discovery service may be classified into two modes, mode A and mode B. A discovery service of mode B includes four processes, which are a passive terminal process, an active terminal process, a query process and a matching process. In the four processes, integrity protection is not performed on a discovery response message of a passive terminal, a discovery response message of an active terminal, a query request message sent by the active terminal to the passive terminal, a query response message sent by the passive terminal to the active terminal, and the matching report message of the active terminal, and there exists a threat of replay attack by an attacker.

SUMMARY OF THE INVENTION

In order to solve the existing technical problem, the present disclosure mainly provides a security method, terminal and system for D2D mode B discovery, and a computer storage medium.

The technical solution of the present disclosure is implemented as follows.

In the first aspect, an embodiment of the present disclosure provides a security method for D2D mode B discovery, which includes:

A ProSe function entity in a home network of a passive terminal sending back a ProSe response code, a ProSe response key to the passive terminal;

the passive terminal receiving the ProSe response code and the ProSe response key.

In an embodiment of the present disclosure, the ProSe function entity in the home network of the passive terminal sending back the ProSe response code and the ProSe response key, includes: the ProSe function entity in the home network of the passive terminal receiving a discovery request message of the passive terminal, performing authentication processing on the passive terminal, and sending a discovery response message to the passive terminal, herein, the discovery response message includes a ProSe response code and a ProSe response key.

In an embodiment of the present disclosure, the discovery response message further includes a current time and a maximum offset value.

In an embodiment of the present disclosure, the discovery response message further includes a mode, a discovery filter, and a validity period.

In the second aspect, an embodiment of the present disclosure provides a security method for D2D mode B discovery, which includes:

a ProSe function entity in a home network of an active terminal receiving a ProSe query code, a ProSe query key, a ProSe response code, and a ProSe response key, which are sent back from a ProSe function entity in another network;

the ProSe function entity in the home network of the active terminal sending back the ProSe query code and the ProSe query key to the active terminal.

In an embodiment of the present disclosure, the ProSe function entity in the home network of the active terminal receiving the ProSe query code, the ProSe query key, the ProSe response code, and the ProSe response key, which are sent back from the ProSe function entity in another network, includes: the ProSe function entity in the home network of the active terminal receiving a first discovery response message sent back from the ProSe function entity in another network, and the first discovery response message includes the ProSe query code, the ProSe query key, the ProSe response code, and the ProSe response key.

In an embodiment of the present disclosure, the first discovery response message further includes a ProSe query code and a discovery filter.

In an embodiment of the present disclosure, the ProSe function entity in the home network of the active terminal sending back the ProSe query code, the ProSe query key, a current time, and a maximum offset value, to the active terminal, includes: after performing broadcast authentication with a ProSe function entity in a visited network in which the active terminal currently registers, the ProSe function entity in the home network of the active terminal sending back a second discovery response message to the active terminal, and the second discovery response message includes the ProSe query code, the ProSe query key, the current time, and the maximum offset value.

In an embodiment of the present disclosure, the second discovery response message further includes a current time and a maximum offset value.

In an embodiment of the present disclosure, the second discovery response message further includes a mode, a discovery filter, and a validity period.

In the third aspect, an embodiment of the present disclosure provides a security method for D2D mode B discovery, which includes:

an active terminal calculating a query message integrity protection code, MIC, sending a ProSe query code, the query MIC, and a time calibration value, to a passive terminal;

the active terminal receiving a ProSe response code and a response MIC which are sent back from the passive terminal.

In an embodiment of the present disclosure, the active terminal calculating the query MIC, includes: the active terminal using the Hash-based Message Authentication Code-Secure Hash Algorithm, HMAC-SHA-256, to calculate the query MIC, that is, MIC=HMAC-SHA-256 (ProSe query key, string S), the string is formed by S=FC||P0||L0||P1||L1||P2||L2, herein, FC is an algorithm type with a fixed length, P0 is a message type (a value of which is set to PC5_DISCOVERY), L0 is a length of the message type, P1 is the ProSe query code, L1 is a length of the ProSe query code, P2 is a counter value based on Universal Time Coordinated, UTC time, and L2 is a length of the counter value.

In the fourth aspect, an embodiment of the present disclosure provides a security method for D2D mode B discovery, which includes:

a passive terminal receiving a ProSe query code, a query MIC, and a time calibration value, which are sent by an active terminal;

the passive terminal sending the ProSe query code, the query MIC, and a counter value based on UTC time, to a ProSe function entity in a home network of the passive terminal, and the ProSe function entity in the home network of the passive terminal checking the query MIC;

the passive terminal calculating a response MIC, and sending back a ProSe response code and the response MIC to the active terminal.

In an embodiment of the present disclosure, the passive terminal calculating the response MIC, includes: the passive terminal using HMAC-SHA-256 to calculate the response MIC, that is, MIC=HMAC-SHA-256 (ProSe response key, string S), the string is formed by S=FC||P0||L0||P1||L1||P2||L2, herein, FC is an algorithm type with a fixed length, P0 is a message type (a value of which is set to PC5_DISCOVERY), L0 is a length of the message type, P1 is the ProSe response code, L1 is a length of the ProSe response code, P2 is a counter value based on UTC time, and L2 is a length of the counter value.

In the fifth aspect, an embodiment of the present disclosure provides a security method for D2D mode B discovery, which includes:

an active terminal sending a ProSe response code, a response MIC, and a counter value based on UTC time, to a ProSe function entity in a home network of the active terminal;

the ProSe function entity in the home network receiving the ProSe response code, the response MIC, and the counter value based on UTC time, analyzing the ProSe response code, and checking the response MIC.

In an embodiment of the present disclosure, the active terminal sending a ProSe response code, a response MIC, and a counter value based on UTC time, to the ProSe function entity in the home network of the active terminal; includes: the active terminal sending a matching report message to the ProSe function entity in the home network of the active terminal, and the matching report message includes the ProSe response code, the response MIC, and the counter value based on UTC time.

In an embodiment of the present disclosure, the matching report message further includes a user identifier of a ProSe restriction discovery application layer, a terminal identifier, a discovery type, and an application identifier.

In the sixth aspect, an embodiment of the present disclosure provides a security system for D2D mode B discovery, which includes a ProSe function entity in a home network of a passive terminal, and the passive terminal, herein, the ProSe function entity in a home network of the passive terminal is configured to send back a ProSe response code, a ProSe response key to the passive terminal;

the passive terminal is configured to receive the ProSe response code and the ProSe response key.

In an embodiment of the present disclosure, the ProSe function entity in home network of the passive terminal is specifically configured to receive a discovery request message of the passive terminal, performs authentication processing on the passive terminal, and sends a discovery response message to the passive terminal, herein, the discovery response message includes a ProSe response code and a ProSe response key.

In an embodiment of the present disclosure, the discovery response message further includes a current time and a maximum offset value.

In the seventh aspect, an embodiment of the present disclosure provides a ProSe function entity in a home network of a passive terminal, and the ProSe function entity includes a request receiving module and a response sending-back module, herein, the receiving module is configured to receive a discovery request message of a passive terminal;

the response sending-back module is configured to send back a discovery response message to the passive terminal, and the discovery response message includes a ProSe response code and a ProSe response key.

In the eighth aspect, an embodiment of the present disclosure provides a ProSe function entity in a home network of an active terminal, and the ProSe function entity includes a first receiving module and a first sending module, herein, the first receiving module is configured to receive a ProSe query code, a ProSe query key, a ProSe response code, and a ProSe response key, which are sent back from a ProSe function entity in another network;

the first sending module is configured to send back the ProSe query code and the ProSe query key to the active terminal.

In an embodiment of the present disclosure, the first receiving module is specifically configured to receive a first discovery response message sent back from a ProSe function entity in another network, and the first discovery response message includes the ProSe query code, the ProSe query key, the ProSe response code, and the ProSe response key.

In an embodiment of the present disclosure, the first sending module is specifically configured to send back a second discovery response message to the active terminal after performing broadcast authentication with a ProSe function entity in a visited network in which the active terminal currently registers, and the second discovery response message includes the ProSe query code and the ProSe query key.

In an embodiment of the present disclosure, the second discovery response message further includes a current time and a maximum offset value.

In the ninth aspect, an embodiment of the present disclosure provides an active terminal, which includes a second sending module and a second receiving module, herein, the second sending module is configured to calculate a query MIC, and to send a ProSe query code, the query MIC, and a time calibration value, to a passive terminal;

the second receiving module is configured to receive a ProSe response code and a response MIC which are sent back from the passive terminal.

In an embodiment of the present disclosure, the second sending module is specifically configured to use HMAC-SHA-256 to calculate the query MIC, that is, MIC=HMAC-SHA-256 (ProSe query key, string S), the string is formed by S=FC∥P0∥L0∥P1∥L1∥P2∥L2, herein, FC is an algorithm type with a fixed length, P0 is a message type (the value of which is set to PC5 DISCOVERY), L0 is a length of the message type, P1 is the ProSe query code, L1 is a length of the ProSe query code, P2 is a counter value based on UTC time, and L2 is a length of the counter value.

In the tenth aspect, an embodiment of the present disclosure provides a passive terminal, which includes a third receiving module, a third sending module and a fourth sending module, herein, the third receiving module is configured to receive a ProSe query code, a query MIC, and a time calibration value, which are sent by an active terminal;

the third sending module is configured to send the ProSe query code, the query MIC, and a counter value based on UTC time, to a ProSe function entity in a home network of the passive terminal, and the query MIC is checked by the ProSe function entity in the home network of the passive terminal;

the fourth sending module is configured to calculate a response MIC and to send back the ProSe response code and the response MIC to the active terminal.

In an embodiment of the present disclosure, the fourth sending module is specifically configured to use HMAC-SHA-256 to calculate the response MIC, that is, MIC=HMAC-SHA-256 (ProSe response key, string S), the string is formed by S=FC∥P0∥L0∥P1∥L1∥P2∥L2, herein, FC is an algorithm type with a fixed length, P0 is a message type (a value of which is set to PC5_DISCOVERY), L0 is a length of the message type, P1 is the ProSe response code, L1 is a length of the ProSe response code, P2 is the counter value based on UTC time, and L2 is a length of the counter value.

In the eleventh aspect, an embodiment of the present disclosure provides a security system for D2D mode B discovery, which includes an active terminal, and a ProSe function entity in a home network of the active terminal, herein, the active terminal is configured to send a ProSe response code, a response MIC, and a counter value based on UTC time, to the ProSe function entity in the home network of the active terminal;

the ProSe function entity in the home network of the active terminal is configured to receive the ProSe response code, the response MIC, and the counter value based on UTC time, to analyze the ProSe response code, and to check the response MIC.

In an embodiment of the present disclosure, the active terminal is specifically configured to send a matching report message to a ProSe function entity 52 in the home network of the active terminal, and the matching report message includes the ProSe response code, the response MIC, and the counter value based on UTC time.

In an embodiment of the present disclosure, the matching report message further includes a user identifier of a ProSe restriction discovery application layer, a terminal identifier, a discovery type, an application identifier.

In the twelfth aspect, an embodiment of the present disclosure provides a computer storage medium, the computer storage medium stores computer-executable instructions, the computer-executable instructions are used to execute the security methods for D2D mode B discovery provided by embodiments of the present disclosure in the first aspect to the fourth aspect.

The present disclosure provides a security method, terminal and system for D2D mode B discovery, and a computer storage medium. During a passive terminal process, a ProSe function entity in a home network sends back a ProSe response code and a ProSe response key to a passive terminal; during an active terminal process, a ProSe function entity in another network sends back a ProSe query code, a ProSe query key, a ProSe response code, and a ProSe response key, to a ProSe function entity in a home network;

a ProSe function entity in a home network sends back a ProSe query code, a ProSe query key, to an active terminal; during a query process, an active terminal calculates the Message Integrity Code (MIC for short), sends a ProSe query code, a query MIC and a time calibration value, to a passive terminal, and the passive terminal sends the ProSe query code, the query MIC and a counter value based on Universal Time Coordinated (UTC for short) to a ProSe function entity in a home network of the passive terminal, and the ProSe function entity in the home network of the passive terminal checks the query MIC, and the passive terminal calculates the response MIC to send back a ProSe response code and the response MIC to the active terminal; during a matching process, an active terminal sends a ProSe response code, a response MIC, and a counter value based on UTC time, to a ProSe function entity in a home network of the active terminal, and the ProSe function entity in the home network analyzes the ProSe response code and checks the response MIC; thus, in four processes of the D2D mode B discovery service, integrity protection is performed on a discovery response message of a passive terminal, a discovery response message of an active terminal, a query request message sent by the active terminal to the passive terminal, a query response message sent by the passive terminal to the active terminal, and the matching report message of the active terminal, and a threat of replay attack by an attacker is prevented.

DETAILED DESCRIPTION

Figure 1:
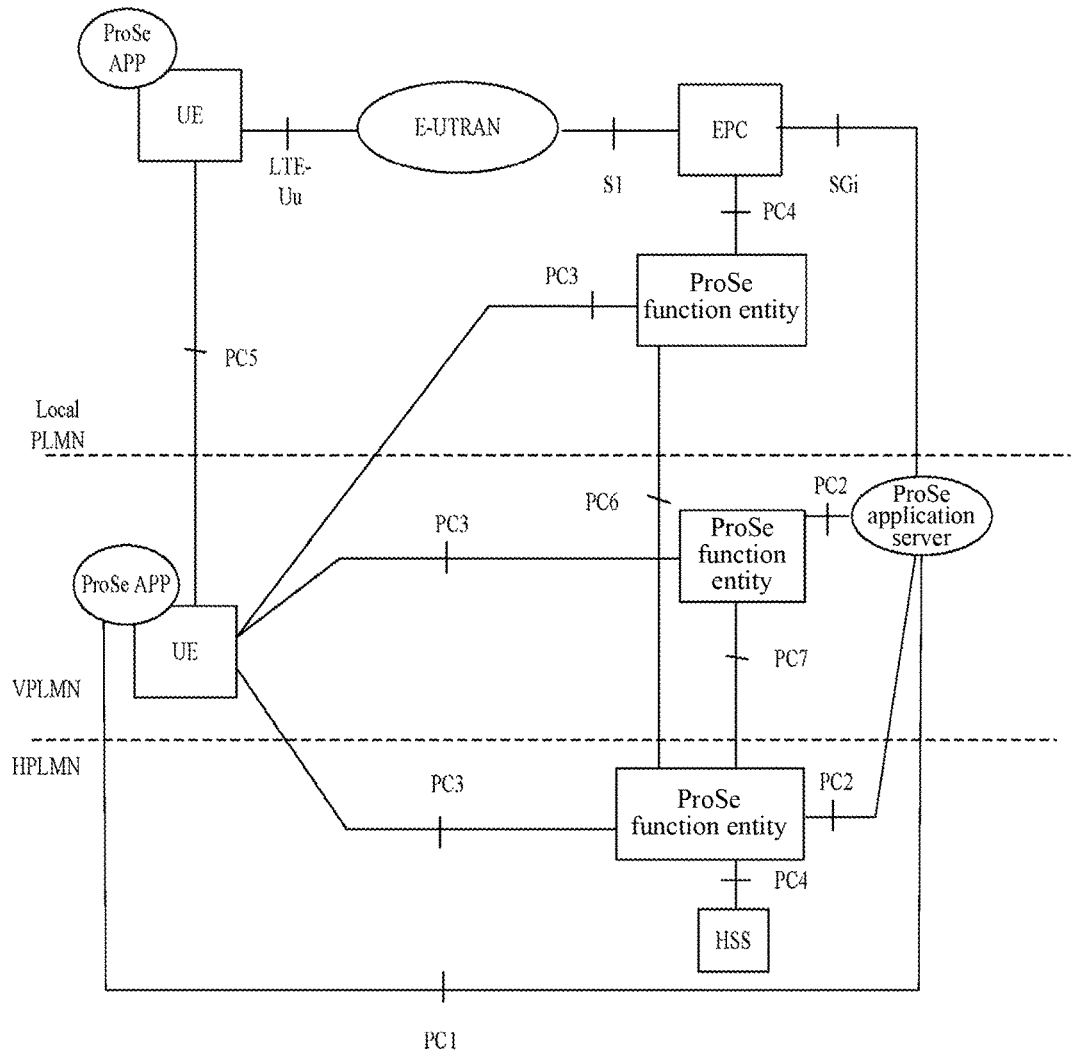
FIG. 1 is a schematic diagram of a communication architecture of a D2D discovery service.
Figure 2:
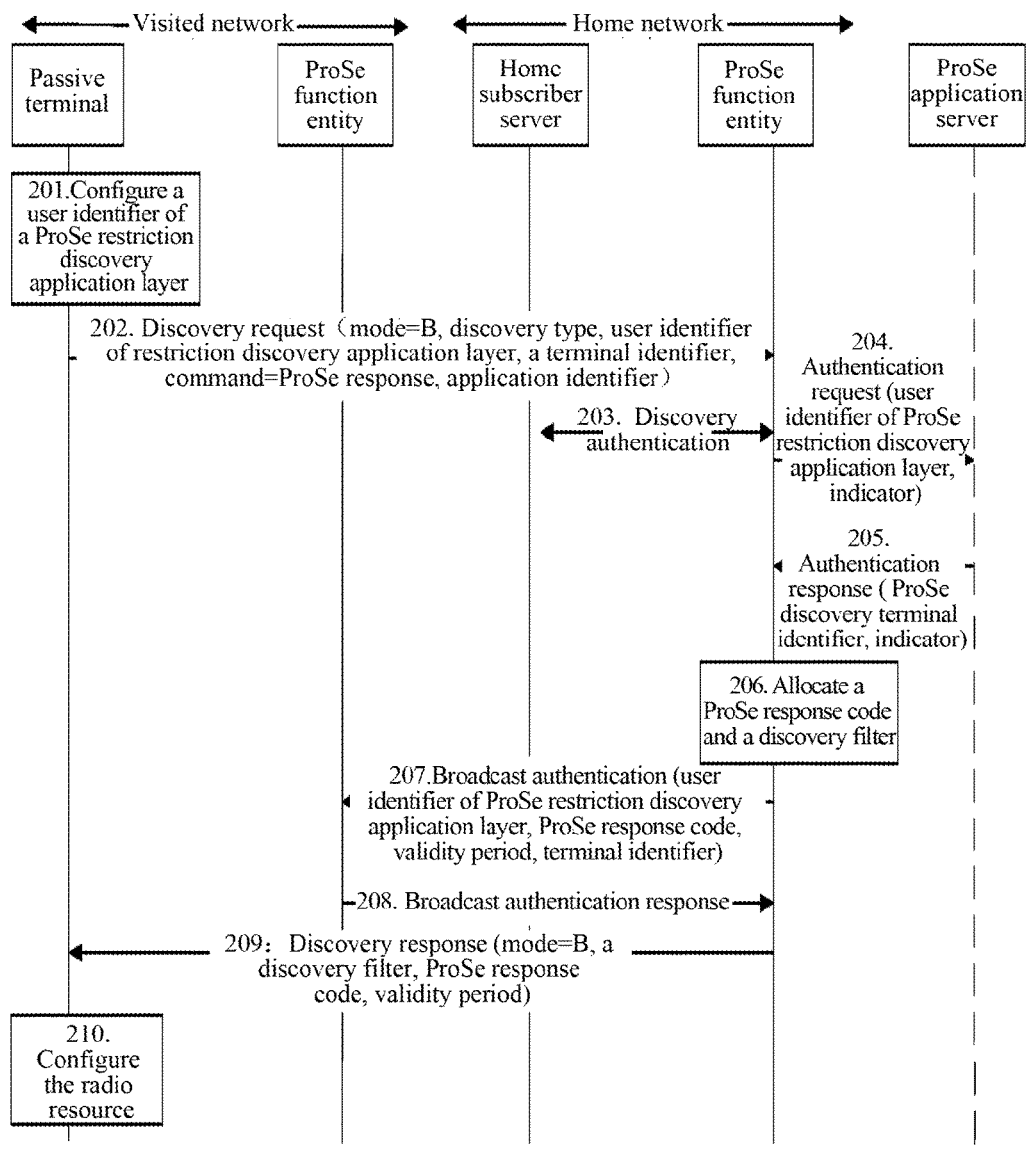
FIG. 2 is a flow chart of an existing passive terminal process.

FIG. 2 is an implementation flow of a passive terminal process in the existing technology.

In step 201, the passive terminal configures a user identifier of a ProSe restriction discovery application layer.

In step 202, the passive terminal sends a discovery request message to a ProSe function entity in a home network of the passive terminal, and the discovery request message includes parameters such as a mode (the value of which is set to B), a discovery type, a user identifier of the restriction discovery application layer, a terminal identifier, a command (the value of which is set to ProSe response), and an application identifier.

In step 203, the ProSe function entity interacts with the home subscriber server to perform the discovery authentication.

In step 204, the ProSe function entity sends an authentication request message to the ProSe application server, and the authentication request message includes parameters such as the user identifier of the ProSe restriction discovery application layer, and an indicator.

In step 205, the ProSe application server sends back an authentication response message to the ProSe function entity, and the authentication response message includes parameters such as a ProSe discovery terminal identifier, and an indicator.

In step 206, the ProSe function entity allocates a ProSe response code and a discovery filter.

In step 207, the ProSe function entity sends a broadcast authentication message to a ProSe function entity in a visited network in which the passive terminal currently registers, and the message includes parameters such as the user identifier of the ProSe restriction discovery application layer, the ProSe response code, a validity period, and the terminal identifier.

In step 208, the ProSe function entity in the visited network sends back a broadcast authentication response message to the ProSe function entity in the home network.

In step 209, the ProSe function entity in the home network sends back a discovery response message to the passive terminal, and the discovery response message includes parameters such as a mode (the value of which is set to B), a discovery filter, a ProSe response code, and a validity period.

In step 210, the passive terminal configures the radio resource.

Figure 3:
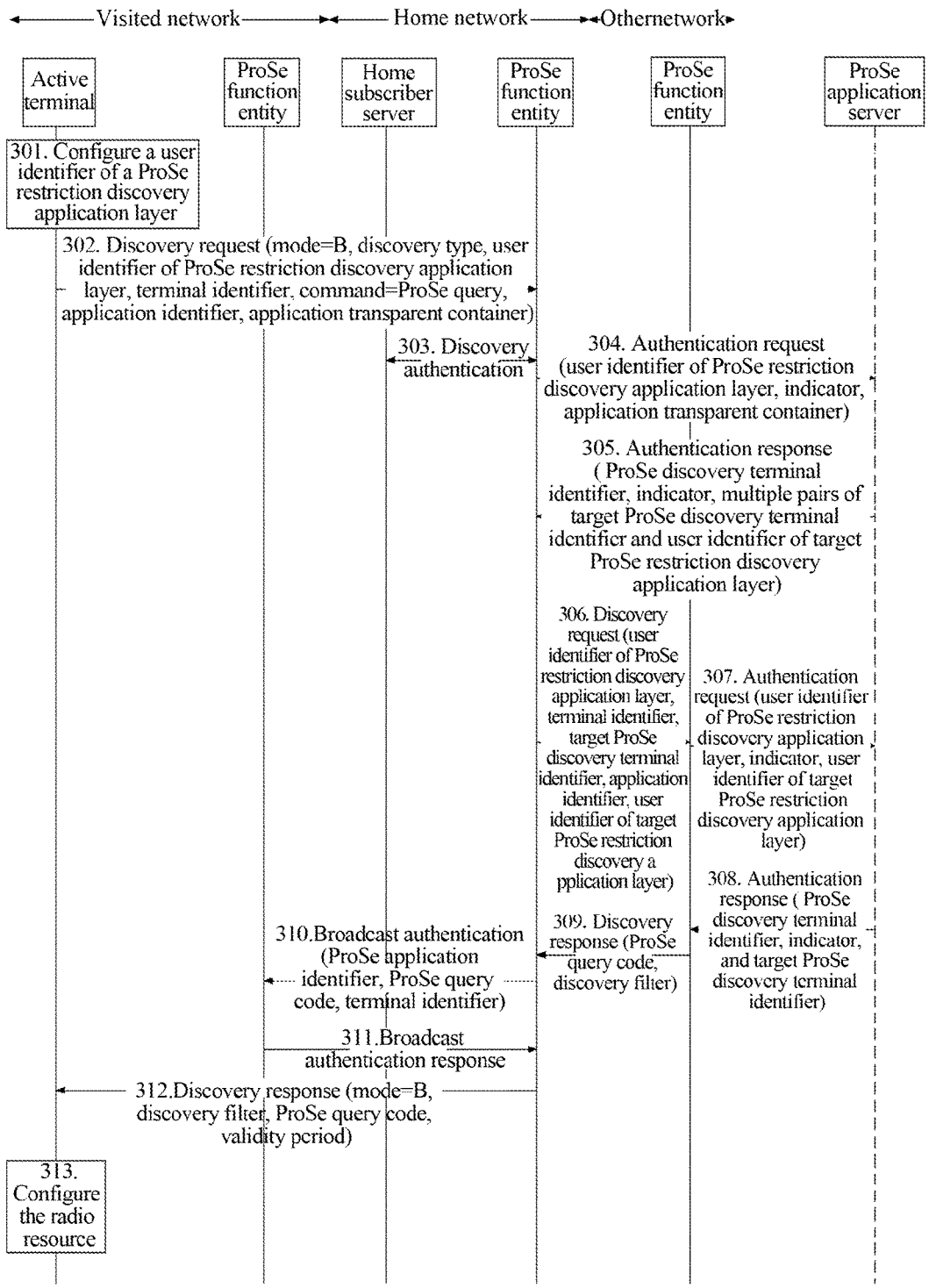
FIG. 3 is a flow chart of an existing active terminal process.

FIG. 3 is an implementation flow of an active terminal process in the existing technology.

In step 301, the active terminal configures a user identifier of a ProSe restriction discovery application layer.

In step 302, the active terminal sends a discovery request message to a ProSe function entity in a home network of the active terminal, and the message includes parameters such as a mode (the value of which is set to B), a discovery type, a user identifier of the ProSe restriction discovery application layer, a terminal identifier, a command (the value of which is set to ProSe query), an application identifier, and an application transparent container.

In step 303, the ProSe function entity in the home network interacts with the home subscriber server to perform the discovery authentication.

In step 304, the ProSe function entity in the home network sends an authentication request message to the ProSe application server, and the authentication request message includes parameters such as the user identifier of the ProSe restriction discovery application layer, an indicator, and a transparent container.

In step 305, the ProSe application server sends back an authentication response message to the ProSe function entity in the home network, and the authentication response message includes parameters such as a ProSe discovery terminal identifier, an indicator, a correspondence between multiple pairs of a target ProSe discovery terminal identifier and a user identifier of a target ProSe restriction discovery application layer.

In step 306, the ProSe function entity in the home network sends a discovery request message to the ProSe function entity in another network, and the discovery request message includes parameters such as the user identifier of the ProSe restriction discovery application layer, the terminal identifier, the target ProSe discovery terminal identifier, the application identifier, and the user identifier of the target ProSe restriction discovery application layer.

In step 307, the ProSe function entity in another network sends an authentication request message to the ProSe application server, and the authentication request message includes parameters such as the user identifier of the ProSe restriction discovery application layer, the indicator, and the user identifier of the target ProSe restriction discovery application layer.

In step 308, the ProSe application server sends back an authentication response message to the ProSe function entity in another network, and the authentication response message includes the ProSe discovery terminal identifier, the indicator, and the target ProSe discovery terminal identifier.

In step 309, the ProSe function entity in another network sends back a discovery response message to the ProSe function entity in home network, and the discovery response message includes parameters such as a ProSe query code and a discovery filter.

In step 310, the ProSe function entity in the home network sends a broadcast authentication message to a ProSe function entity in a visited network in which the active terminal currently registers, and the message includes parameters such as a ProSe application identifier, the ProSe query code and the terminal identifier.

In step 311, the ProSe function entity in the visited network sends back a broadcast authentication response message to the ProSe function entity in the home network.

In step 312, the ProSe function entity in the home network sends back a discovery response message to the active terminal, and the discovery response message includes parameters such as a mode (the value of which is set to B), the discovery filter, the ProSe query code, and a validity period.

In step 313, the active terminal configures the radio resource.

Figure 4:
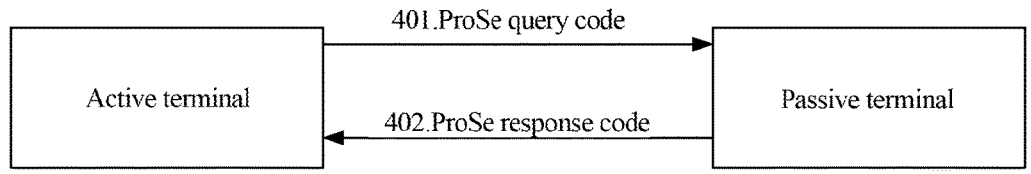
FIG. 4 is a flow chart of an existing query process.

FIG. 4 is an implementation flow of a query process in the existing technology.

In step 401, the active terminal sends a query request message to a passive terminal, and the query request message includes ProSe query code parameter.

In step 402, the passive terminal checks the ProSe query code, and if the ProSe query code is successfully checked, the passive terminal sends back a query request message to the active terminal, and the message includes ProSe response code parameter.

Figure 5:
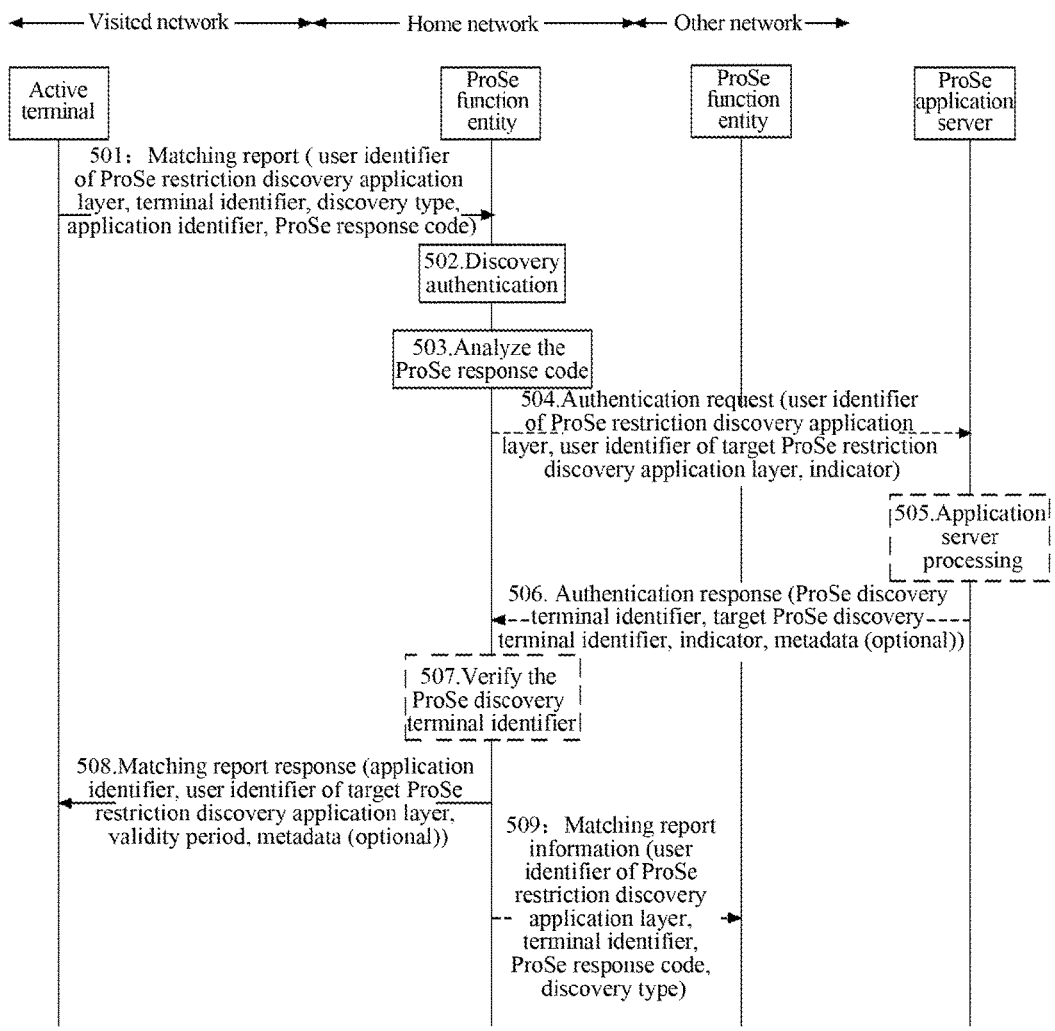
FIG. 5 is a flow chart of an existing matching process.

FIG. 5 is an implementation flow of a matching process in the existing technology.

In step 501, an active terminal sends a matching report message to a ProSe function entity in a home network of the active terminal, and the matching report message includes parameters such as a user identifier of a ProSe restriction discovery application layer, a terminal identifier, a discovery type, an application identifier, and a ProSe response code.

In step 502, the ProSe function entity in the home network performs discovery authentication.

In step 503, the ProSe function entity in the home network analyzes the ProSe response code.

In step 504, the ProSe function entity in the home network sends an authentication request message to the ProSe application server, and the authentication request message includes parameters such as the user identifier of the ProSe restriction discovery application layer, the user identifier of a target ProSe restriction discovery application layer, and an indicator.

In step 505, the ProSe application server processes.

In step 506, the ProSe application server sends back an authentication response message to the ProSe function entity in the home network, and the authentication response message includes parameters such as a ProSe discovery terminal identifier, a target ProSe discovery terminal identifier, and the indicator. In an implementation mode, the authentication response message may further include metadata parameter.

In step 507, the ProSe function entity in the home network verifies the ProSe discovery terminal identifier.

In step 508, the ProSe function entity in the home network sends back a matching report response message to the active terminal, and the matching report response message includes parameters such as the application identifier, the user identifier of the target ProSe restriction discovery application layer, and a validity period. In an implementation mode, the authentication response message may further include metadata parameter.

In step 509, the ProSe function entity in the home network sends a matching report information message to a ProSe function entity in another network, and the matching report information message includes parameters such as the user identifier of the ProSe restriction discovery application layer, the terminal identifier, the target ProSe discovery terminal identifier, the application identifier, the ProSe response code, and the discovery type.

In the above-mentioned process, integrity protection is not performed on all of a discovery response message of the passive terminal, a discovery response message of the active terminal, a query request message sent by the active terminal to the passive terminal, a query response message sent by the passive terminal to the active terminal, and a matching report message of the active terminal, there exists a threat of replay attack by an attacker.

The present disclosure is further described in detail with reference to the accompanying drawings and the specific embodiments hereinafter.

Embodiment One

Figure 6:
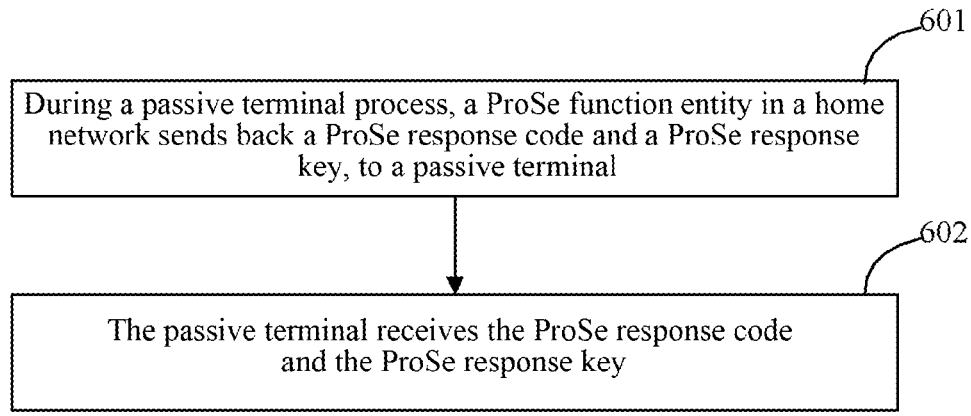
FIG. 6 is a flow chart of a security method for D2D mode B discovery implemented in the embodiment one of the present disclosure.

A security method for D2D mode B discovery is implemented in an embodiment of the present disclosure, and as shown in FIG. 6, the method includes the following steps 601 and 602.

In step 601, during a passive terminal process, a ProSe function entity in a home network of a passive terminal sends back a ProSe response code and a ProSe response key, to a passive terminal.

Specifically, the ProSe function entity in the home network of the passive terminal receives a discovery request message of the passive terminal, performs authentication processing on the passive terminal, and sends a discovery response message to the passive terminal, herein, the discovery response message includes a ProSe response code and a ProSe response key.

In an implementation mode, the discovery response message further includes a current time and a maximum offset value.

In an implementation mode, the discovery response message further includes parameters such as a mode (the value of which is set to B), a discovery filter, a validity period.

Herein, the ProSe response key is generated by the ProSe function entity with a key generator; the current time is a current time at which the ProSe function entity reads its own clock; and the maximum offset value is set by the ProSe function entity itself.

In step 602, the passive terminal receives the ProSe response code and the ProSe response key.

Specifically, the passive terminal receives a discovery response message, which includes the ProSe response code and the ProSe response key.

In an implementation mode, the discovery response message further includes a current time and a maximum offset value.

In an implementation mode, the discovery response message further includes parameters such as a mode (the value of which is set to B), a discovery filter, a validity periods.

In an implementation mode, the passive terminal further configures the radio resource according to a discovery response.

Embodiment Two

Figure 7:
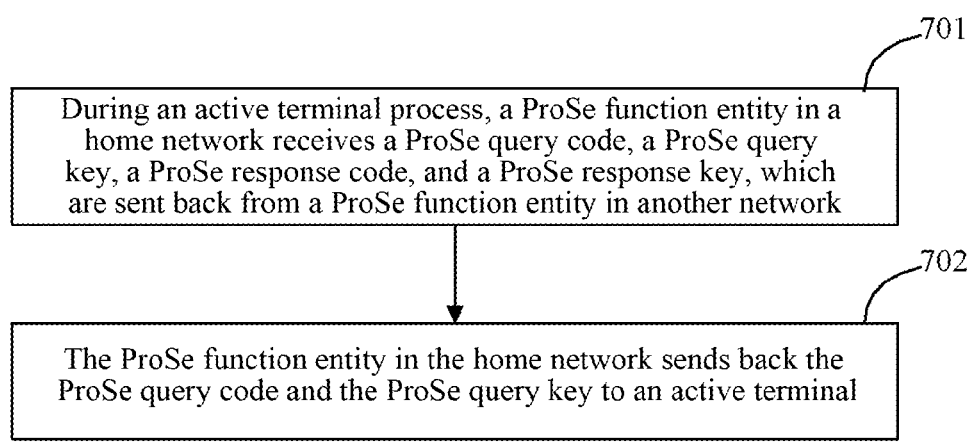
FIG. 7 is a flow chart of a security method for D2D mode B discovery implemented in the embodiment two of the present disclosure.

A security method for D2D mode B discovery is implemented in an embodiment of the present disclosure, and as shown in FIG. 7, the method includes the following steps 701 and 702.

In step 701, during an active terminal process, a ProSe function entity in a home network of an active terminal receives a ProSe query code, a ProSe query key, a ProSe response code, and a ProSe response key, which are sent back from a ProSe function entity in another network.

Specifically, the ProSe function entity in the home network of active terminal receives a first discovery response message sent back from a ProSe function entity in another network, and the first discovery response message includes the ProSe query code, the ProSe query key, the ProSe response code, and the ProSe response key.

In an implementation mode, the first discovery response message further includes parameters such as a ProSe query code, a discovery filter.

Herein, the ProSe query key is similar to the ProSe response key, and is generated by the ProSe function entity with a key generator.

In step 702, the ProSe function entity in the home network of the active terminal sends back the ProSe query code and the ProSe query key to an active terminal.

Specifically, after performing broadcast authentication with a ProSe function entity in a visited network in which the active terminal currently registers, the ProSe function entity in the home network of the active terminal sends back a second discovery response message to the active terminal, and the second discovery response message includes the ProSe query code and the ProSe query key.

In an implementation mode, the second discovery response message further includes a current time and a maximum offset value.

In an implementation mode, the second discovery response message further includes parameters such as a mode (the value of which is set to B), a discovery filter, a validity period.

Embodiment Three

Figure 8:
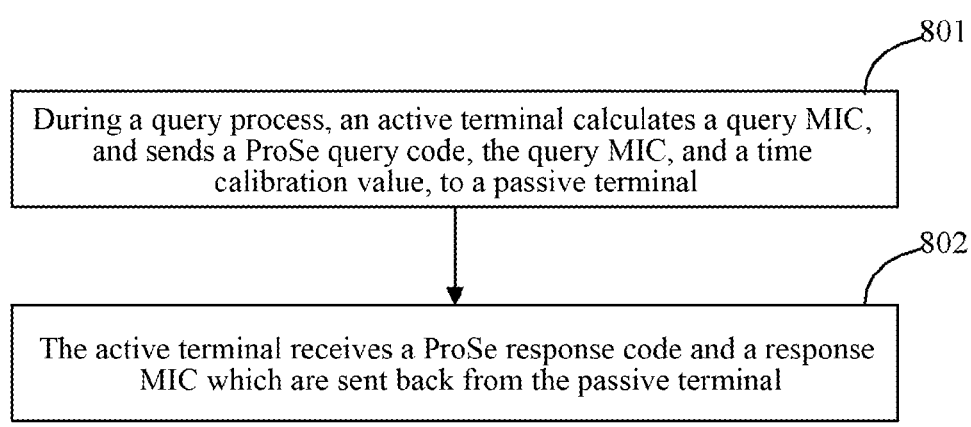
FIG. 8 is a flow chart of a security method for D2D mode B discovery implemented in the embodiment three of the present disclosure.

A security method for D2D mode B discovery is implemented in an embodiment of the present disclosure, and as shown in FIG. 8, the method includes the following steps 801 and 802.

In step 801, during a query process, an active terminal calculates a query MIC, and sends a ProSe query code, the query MIC, and a time calibration value, to a passive terminal.

Specifically, the active terminal uses a signature algorithm, that is, the Hash-based Message Authentication Code (HMAC for short)-Secure Hash Algorithm (SHA-256 for short) to calculate the query MIC, that is, MIC=HMAC-SHA-256 (ProSe query key, string S), the string is formed by S=FC||P0||L0||P1||L1||P2||L2, herein, FC is an algorithm type with a fixed length, P0 is the message type (the value of which is set to PC5_DISCOVERY), L0 is the length of the message type, P1 is the ProSe query code, L1 is the length of the ProSe query code, P2 is the counter value based on UTC time, L2 is the length of the counter value. Then the query request message is sent to the passive terminal, and the query request message includes the ProSe query code, the query MIC, and the time calibration value, and the time calibration value may be the lower four bits of the counter value and is in binary form.

In step 802, the active terminal receives a ProSe response code and a response MIC which are sent back from the passive terminal.

Specifically, the active terminal receives a query response message sent back from the passive terminal, and the query response message includes the ProSe response code and the response MIC calculated by the passive terminal.

The query response message further includes a time calibration value provided by the passive terminal, and the time calibration value may be the lower four bits of a counter value of the passive terminal based on UTC time and is in binary form.

Embodiment Four

Figure 9:
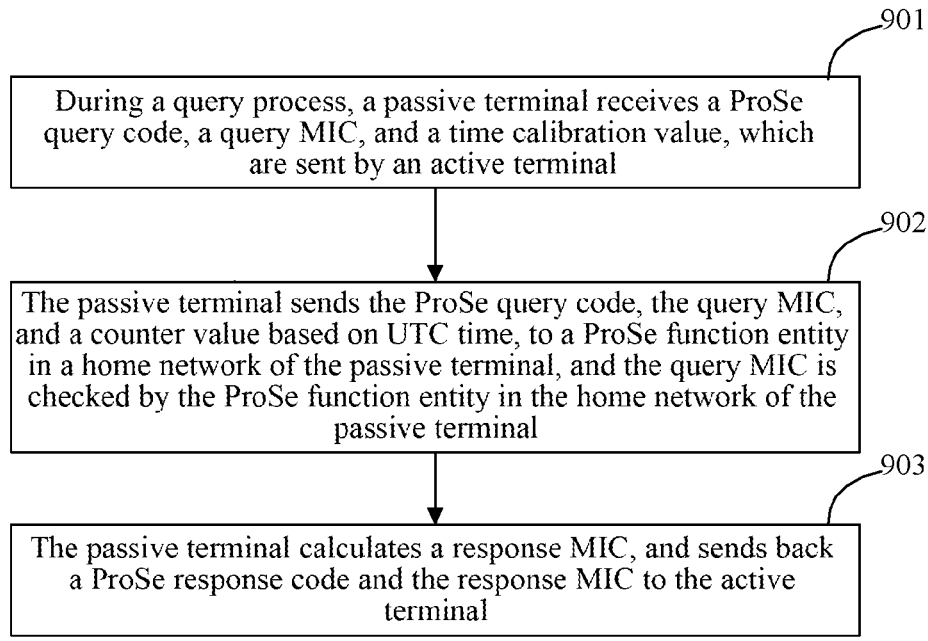
FIG. 9 is a flow chart of a security method for D2D mode B discovery implemented in the embodiment four of the present disclosure.

A security method for D2D mode B discovery is implemented in an embodiment of the present disclosure, and as shown in FIG. 9, the method includes the following steps 901-903.

In step 901, during a query process, a passive terminal receives a ProSe query code, a query MIC, and a time calibration value, which are sent by an active terminal.

Specifically, the passive terminal receives a query request message sent by the active terminal, and the query request message further includes the ProSe query code, the query MIC, and the time calibration value, and the time calibration value may be the lower four bits of a counter value of the active terminal based on UTC time and is in binary form.

In step 902, the passive terminal sends the ProSe query code, the query MIC, and a counter value based on UTC time, to a ProSe function entity in the home network of the passive terminal, and the query MIC is checked by the ProSe function entity in the home network of the passive terminal.

Specifically, the passive terminal sends an authentication request message to a ProSe function entity in the home network of the passive terminal, and the authentication request message includes the ProSe query code, the query MIC, and a counter value based on UTC time.

In step 903, the passive terminal calculates a response MIC, and sends back a ProSe response code and the response MIC to the active terminal.

Specifically, the passive terminal uses a signature algorithm, that is, HMAC-SHA-256, to calculate the response MIC, that is, MIC=HMAC-SHA-256 (ProSe response key, string S), the string is formed by S=FC||P0||L0||P1||L1||P2||L2, herein, FC is an algorithm type with a fixed length, P0 is the message type (the value of which is set to PC5_DISCOVERY), L0 is the length of the message type, P1 is the ProSe response code, L1 is the length of the ProSe response code, P2 is the counter value based on UTC time, L2 is the length of the counter value. Then the query response message is sent back to the active terminal, and the query response message includes the ProSe response code and the response MIC.

The query response message further includes parameters such as a time calibration value provided by the passive terminal, and the time calibration value may be the lower four bits of a counter value of the passive terminal based on UTC time and is in binary form.

Embodiment Five

Figure 10:
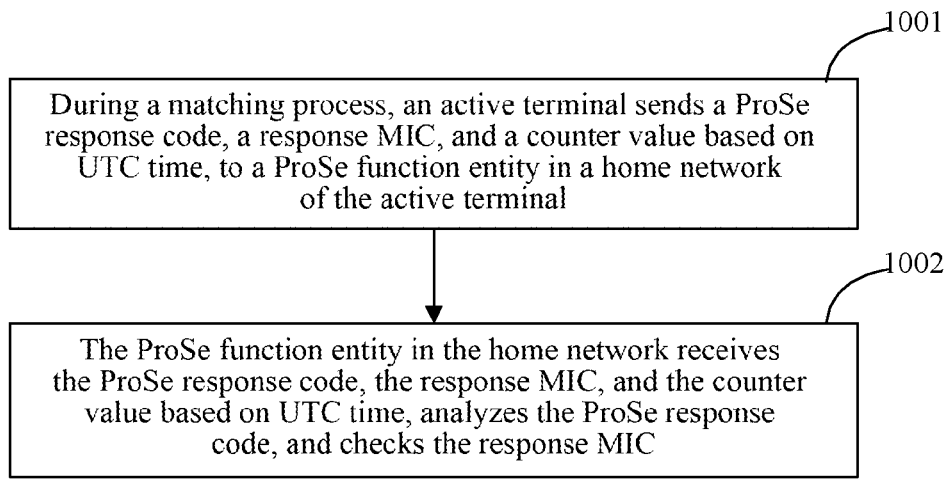
FIG. 10 is a flow chart of a security method for D2D mode B discovery implemented in the embodiment five of the present disclosure.

A security method for D2D mode B discovery is implemented in an embodiment of the present disclosure, and as shown in FIG. 10, the method includes the following steps 1001 and 1002.

In step 1001, during a matching process, an active terminal sends a ProSe response code, a response MIC, and a counter value based on UTC time, to a ProSe function entity in a home network of the active terminal.

Specifically, the active terminal sends a matching report message to a ProSe function entity in the home network of the active terminal, and the matching report message includes the ProSe response code, the response MIC, and the counter value based on UTC time.

The matching report message further includes parameters such as a user identifier of a ProSe restriction discovery application layer, a terminal identifier, a discovery type, an application identifier.

In step 1002, the ProSe function entity in the home network receives the ProSe response code, the response MIC, and the counter value based on UTC time, analyzes the ProSe response code, and checks the response MIC.

Specifically, the ProSe function entity in the home network receives the matching report message, and the matching report message includes the ProSe response code, the response MIC, and the counter value based on UTC time.

The matching report message further includes parameters such as a user identifier of a ProSe restriction discovery application layer, a terminal identifier, a discovery type, an application identifier.

The embodiments of the four processes of the D2D mode B discovery service of the present disclosure may be implemented together to perform integrity protection on a discovery response message of the passive terminal, a discovery response message of the active terminal, a query request message sent by the active terminal to the passive terminal, a query response message sent by the passive terminal to the active terminal, and the matching report message of the active terminal.

Embodiment Six

Figure 11:
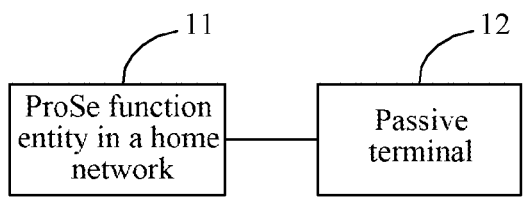
FIG. 11 is a structural diagram of a security system for D2D mode B discovery implemented in the embodiment six of the present disclosure.

In order to achieve the above-described method, a security system for D2D mode B discovery is implemented in an embodiment of the present disclosure, as shown in FIG. 11, which includes a ProSe function entity 11 in a home network of a passive terminal, and a passive terminal 12.

The ProSe function entity 11 in the home network of the passive terminal is used to send back a ProSe response code, a ProSe response key to the passive terminal 12 during a passive terminal process of a discovery service of a D2D mode B.

The passive terminal 12 is used to receive the ProSe response code and the ProSe response key.

Specifically, the ProSe function entity 11 in the home network of the passive terminal receives a discovery request message of the passive terminal 12, performs authentication processing on the passive terminal 12, and sends a discovery response message to the passive terminal 12, herein, the discovery response message includes a ProSe response code and a ProSe response key.

In an implementation mode, the discovery response message further includes a current time and a maximum offset value.

In an implementation mode, the discovery response message further includes parameters such as a mode (the value of which is set to B), a discovery filter, a validity period.

The passive terminal 12 receives the discovery response message.

In an implementation mode, the passive terminal 12 further configures the radio resource according to a discovery response.

Embodiment Seven

Figure 12:
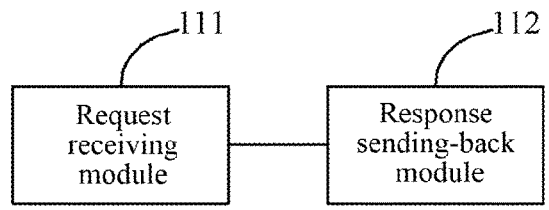
FIG. 12 is a structural diagram of a ProSe function entity in a home network of a passive terminal provided in the embodiment seven of the present disclosure.

A ProSe function entity in a home network of a passive terminal is implemented in an embodiment of the present disclosure, as shown in FIG. 12, the ProSe function entity includes a request receiving module 111 and a response sending-back module 112.

The receiving module 111 is configured to receive a discovery request message of a passive terminal.

The response sending-back module 112 is configured to send back a discovery response message to the passive terminal, and the discovery response message includes a ProSe response code and a ProSe response key.

In an implementation mode, the discovery response message further includes a current time and a maximum offset value.

In an implementation mode, the discovery response message further includes parameters such as a mode (the value of which is set to B), a discovery filter, a validity period.

Embodiment Eight

Figure 13:
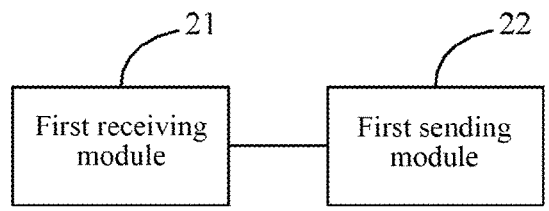
FIG. 13 is a structural diagram of a ProSe function entity in a home network of an active terminal provided in the embodiment eight of the present disclosure.

A ProSe function entity in a home network of a passive terminal is implemented in an embodiment of the present disclosure, as shown in FIG. 13, the ProSe function entity includes a first receiving module 21 and a first sending module 22.

The first receiving module 21 may be implemented by an interface of the ProSe function entity in the home network with a ProSe function entity in another network, configured to receive a ProSe query code, a ProSe query key, a ProSe response code and a ProSe response key sent back by the ProSe function entity in another network during the active terminal process of the discovery service of a D2D mode B.

The first sending module 22 may be implemented by an interface of the ProSe function entity in the home network with an active terminal, configured to send back the ProSe query code and the ProSe query key to the active terminal.

Specifically, the first receiving module 21 receives a first discovery response message sent back from a ProSe function entity in another network, and the first discovery response message includes the ProSe query code, the ProSe query key, the ProSe response code, and the ProSe response key.

In an implementation mode, the first discovery response message further includes parameters such as a ProSe query code, a discovery filter.

After performing broadcast authentication with a ProSe function entity in a visited network in which the active terminal currently registers, the first sending module 22 sends back a second discovery response message to the active terminal, and the second discovery response message includes the ProSe query code and the ProSe query key.

In an implementation mode, the second discovery response message further includes a current time and a maximum offset value.

In an implementation mode, the second discovery response message further includes parameters such as a mode (the value of which is set to B), a discovery filter, a validity period.

Embodiment Nine

Figure 14:
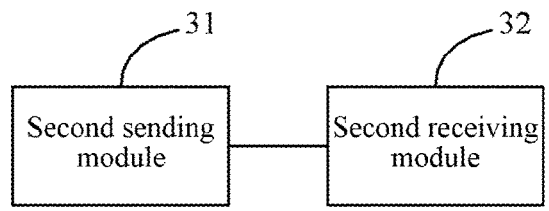
FIG. 14 is a structural diagram of an active terminal provided in the embodiment nine of the present disclosure.

An active terminal is implemented in an embodiment of the present disclosure, as shown in FIG. 14, the active terminal includes a second sending module 31 and a second receiving module 32.

The second sending module 31 may be implemented by a processor with an interface, and the second sending module is configured to calculate a query MIC, and to send a ProSe query code, the query MIC, and a time calibration value, to a passive terminal during a query process of a discovery service of a D2D mode B.

The second receiving module 32 may be implemented by an interface, and is configured to receive a ProSe response code and a response MIC which are sent back from the passive terminal.

Specifically, the second sending module 31 uses the HMAC-SHA-256 to calculate the query MIC, that is, MIC=HMAC-SHA-256 (ProSe query key, string S), the string is formed by S=FC||P0||L0||P1||L1||P2||L2, herein, FC is an algorithm type with a fixed length, P0 is the message type (the value of which is set to PC5_DISCOVERY), L0 is the length of the message type, P1 is the ProSe query code, L1 is the length of the ProSe query code, P2 is the counter value based on UTC time, L2 is the length of the counter value. Then the query request message is sent to the passive terminal, and the query request message includes the ProSe query code, the query MIC, and the time calibration value, and the time calibration value may be the lower four bits of the counter value and is in binary form.

The second receiving module 32 receives a query response message sent back from the passive terminal, and the query response message includes the ProSe response code and the response MIC calculated by the passive terminal.

The query response message further includes a time calibration value provided by the passive terminal, and the time calibration value may be the lower four bits of a counter value of the passive terminal based on UTC time and is in binary form.

The Tenth Embodiment

Figure 15:
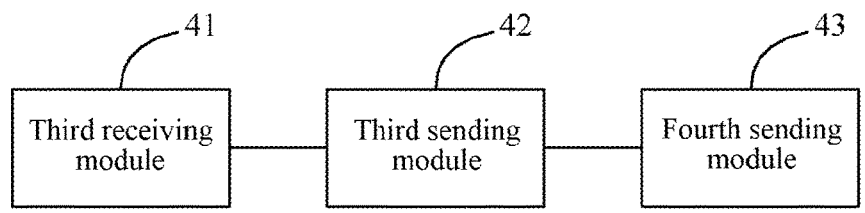
FIG. 15 is a structural diagram of a passive terminal provided in the embodiment ten of the present disclosure.

A passive terminal is implemented in an embodiment of the present disclosure, as shown in FIG. 15, the passive terminal includes a third receiving module 41, a third sending module 42 and a fourth sending module 43.

The third receiving module 41 may be implemented by an interface, and the third receiving module 41 is configured to receive a ProSe query code, a query MIC, and a time calibration value which are sent by an active terminal during a query process of a discovery service of a D2D mode B.

The third sending module 42 may be implemented by an interface, and is configured to send the ProSe query code, the query MIC, and a counter value based on UTC time, to a ProSe function entity in a home network of the passive terminal, and the query MIC is checked by the ProSe function entity in the home network of the passive terminal.

The fourth sending module 43 may be implemented by a processor with an interface, and is configured to calculate the response MIC and to send back the ProSe response code and response MIC to the active terminal.

Specifically, the third receiving module 41 receives a query request message sent by the active terminal, and the query request message includes the ProSe query code, the query MIC, and the time calibration value, and the time calibration value may be the lower four bits of a counter value of the active terminal based on UTC time and is in binary form.

The third sending module 42 sends an authentication request message to a ProSe function entity in a home network of the passive terminal, and the authentication request message includes the ProSe query code, the query MIC, and a counter value based on UTC time.

The fourth sending module 43 uses HMAC-SHA-256 to calculate the response MIC, that is, MIC=HMAC-SHA-256 (ProSe response key, string S), the string is formed by S=FC||P0||L0||P1||L1||P2||L2, herein, FC is an algorithm type with a fixed length, P0 is the message type (the value of which is set to PC5_DISCOVERY), L0 is the length of the message type, P1 is the ProSe response code, L1 is the length of the ProSe response code, P2 is the counter value based on UTC time, L2 is the length of the counter value. Then the query response message is sent back to the active terminal, and the query response message includes the ProSe response code and the response MIC.

The query response message further includes parameters such as a time calibration value provided by the passive terminal, and the time calibration value may be the lower four bits of a counter value of the passive terminal based on UTC time and is in binary form.

Embodiment Eleven

Figure 16:
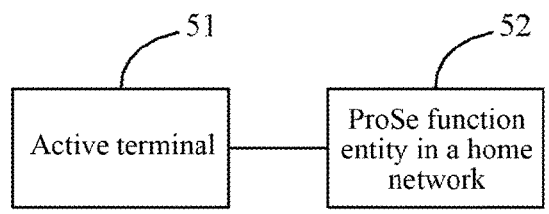
FIG. 16 is a structural diagram of a security system for D2D mode B discovery provided in the embodiment eleven of the present disclosure.

A security system for D2D mode B discovery is implemented in an embodiment of the present disclosure, as shown in FIG. 16, the system includes an active terminal 51, and a ProSe function entity 52 in a home network of an active terminal.

The active terminal 51 is configured to, during a matching process of the discovery service of a D2D mode B, send a ProSe response code, a response MIC, and a counter value based on UTC time, to the ProSe function entity in a home network of the active terminal.

The ProSe function entity 52 in the home network is configured to receive the ProSe response code, the response MIC, and the counter value based on UTC time, to analyze the ProSe response code, and to check the response MIC.

Specifically, the active terminal 51 sends a matching report message to a ProSe function entity 52 in a home network of the active terminal, and the matching report message includes the ProSe response code, the response MIC, and the counter value based on UTC time.

The matching report message further includes parameters such as a user identifier of a ProSe restriction discovery application layer, a terminal identifier, a discovery type, an application identifier.

The ProSe function entity 52 in the home network receives the matching report, and the matching report message includes the ProSe response code, the response MIC, and the counter value based on UTC time.

The matching report message further includes parameters such as a user identifier of a ProSe restriction discovery application layer, a terminal identifier, a discovery type, an application identifier.

The four processes of the present disclosure will be further described with reference to several specific examples.

Figure 17:
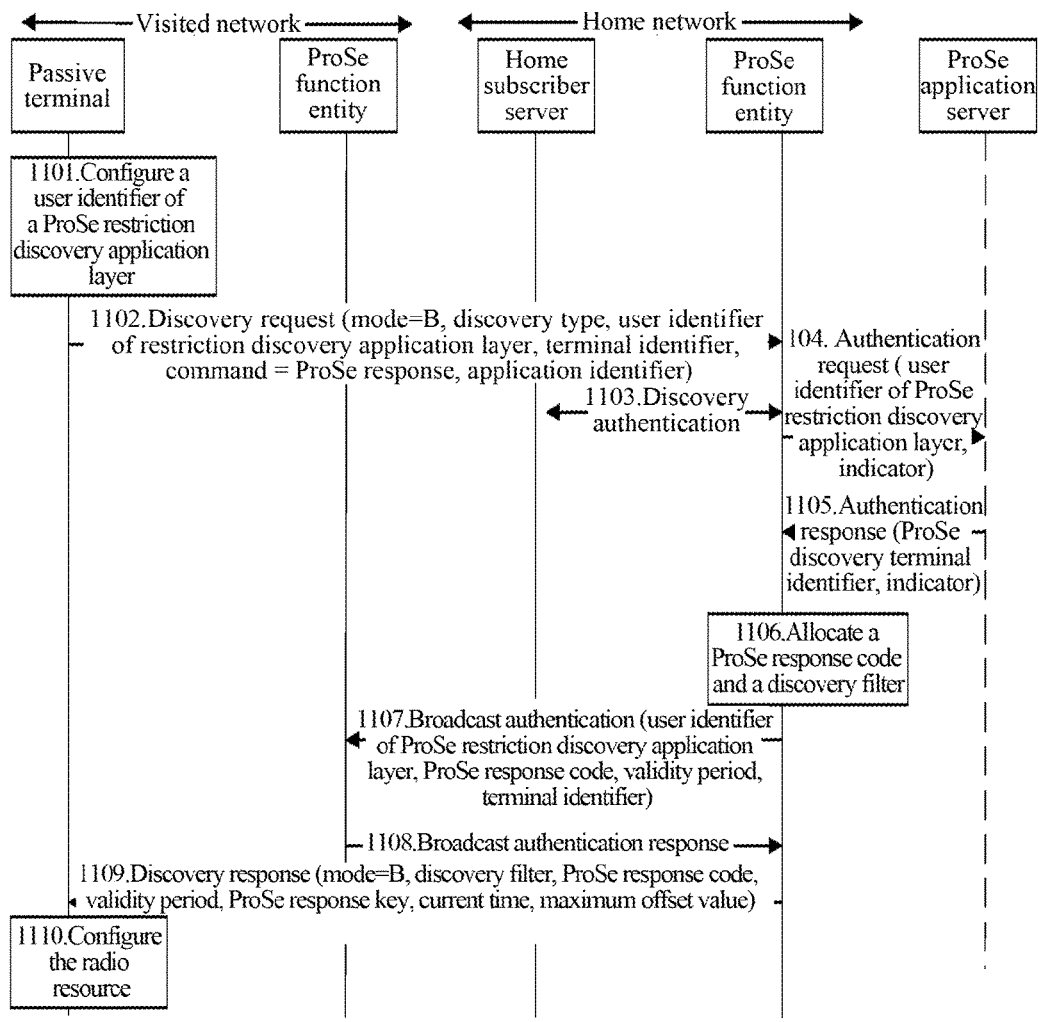
FIG. 17 is a specific flow chart of a passive terminal process according to an embodiment of the present disclosure.

An implementation flow of a passive terminal process is as shown in FIG. 17.

In step 1101, the passive terminal configures a user identifier of a ProSe restriction discovery application layer.

In step 1102, the passive terminal sends a discovery request message to a ProSe function entity in a home network of the passive terminal, and the discovery request message includes parameters such as a mode (the value of which is set to B), a discovery type, the user identifier of the restriction discovery application layer, a terminal identifier, a command (the value of which is set to ProSe response), an application identifier.

In step 1103, the ProSe function entity interacts with the home subscriber server to perform the discovery authentication.

In step 1104, the ProSe function entity sends an authentication request message to the ProSe application server, and the authentication request message includes parameters such as the user identifier of the ProSe restriction discovery application layer, an indicator.

In step 1105, the ProSe application server sends back an authentication response message to the ProSe function entity, and the authentication response message includes parameters such as a ProSe discovery terminal identifier, an indicator.

In step 1106, the ProSe function entity allocates a ProSe response code and a discovery filter.

In step 1107, the ProSe function entity sends a broadcast authentication message to a ProSe function entity in a visited network in which the passive terminal currently registers, and the broadcast message includes parameters such as the user identifier of the ProSe restriction discovery application layer, the ProSe response code, a validity period, the terminal identifier.

In step 1108, the ProSe function entity in the visited network sends back a broadcast authentication response message to a function entity in the home network.

In step 1109, the ProSe function entity in the home network sends back a discovery response message to the passive terminal, and the discovery response message includes parameters such as a mode (the value of which is set to B), the discovery filter, the ProSe response code, a validity period, a ProSe response key, a current time, a maximum offset value.

In step 1110, the passive terminal configures the radio resource.

Figure 18:
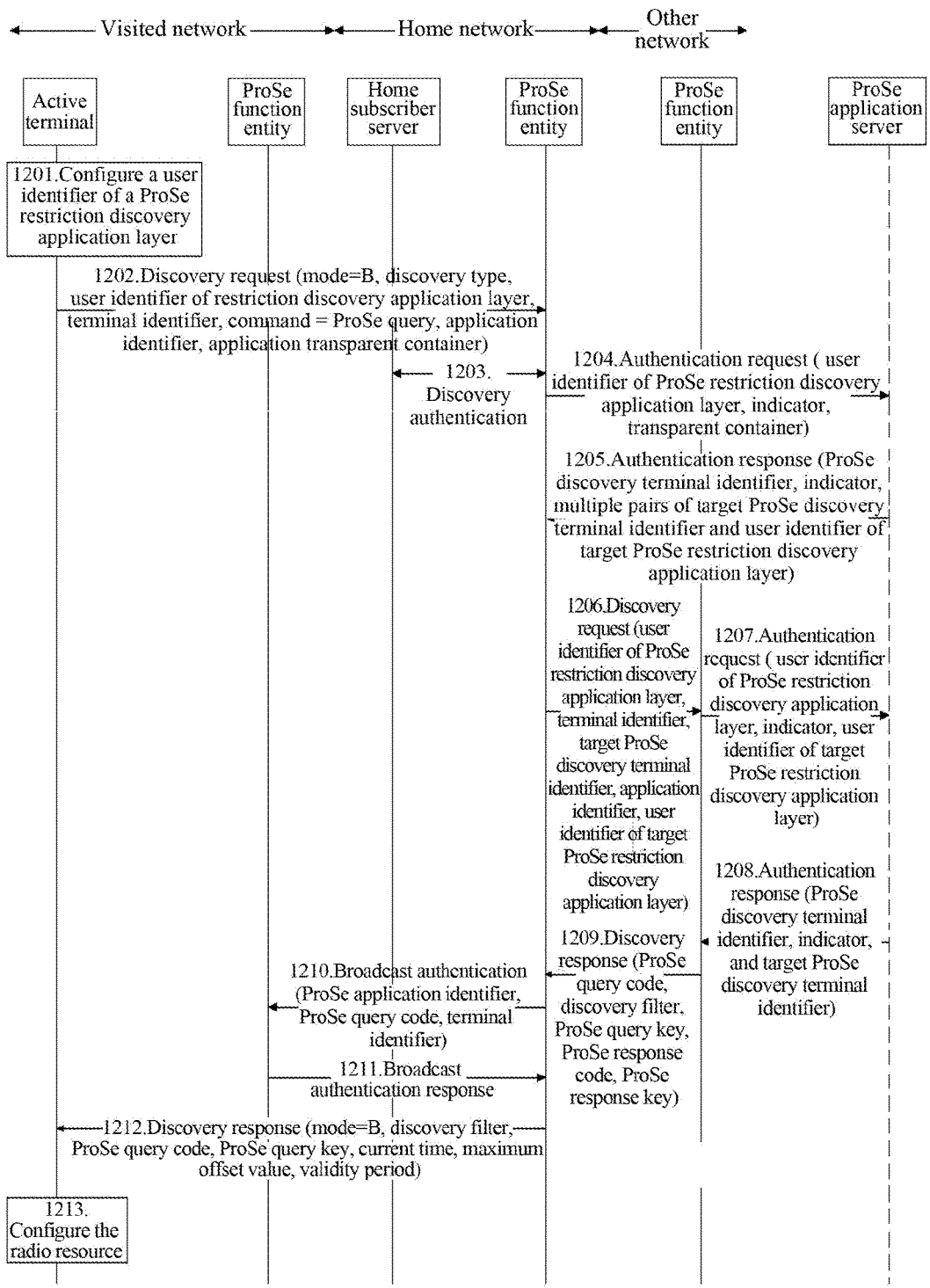
FIG. 18 is a specific flow chart of an active terminal process according to an embodiment of the present disclosure.

An implementation flow of an active terminal process is as shown in FIG. 18.

In step 1201, the active terminal configures a user identifier of a ProSe restriction discovery application layer.

In step 1202, the active terminal sends a discovery request message to a ProSe function entity in a home network of the active terminal, and the message includes parameters such as a mode (the value of which is set to B), a discovery type, a user identifier of a restriction discovery application layer, a terminal identifier, a command (the value of which is set to ProSe query), an application identifier, an application transparent container.

In step 1203, the ProSe function entity interacts with the home subscriber server to perform the discovery authentication.

In step 1204, the ProSe function entity sends an authentication request message to the ProSe application server, and the authentication request message includes parameters such as the user identifier of the ProSe restriction discovery application layer, an indicator, a transparent container.

In step 1205, the ProSe application server sends back an authentication response message to the ProSe function entity, and the authentication response message includes parameters such as a ProSe discovery terminal identifier, an indicator, a correspondence between multiple pairs of a target ProSe discovery terminal identifier and the user identifier of the target ProSe restriction discovery application layer.

In step 1206, the ProSe function entity in the home network sends a discovery request message to the ProSe function entity in another network, and the discovery request message includes parameters such as the user identifier of the ProSe restriction discovery application layer, the terminal identifier, the target ProSe discovery terminal identifier, the application identifier, the user identifier of the target ProSe restriction discovery application layer.

In step 1207, the ProSe function entity in another network sends an authentication request message to the ProSe application server, and the authentication request message includes parameters such as the user identifier of the ProSe restriction discovery application layer, the indicator, the user identifier of the target ProSe restriction discovery application layer.

In step 1208, the ProSe application server sends back an authentication response message to the ProSe function entity in another network, and the authentication response message includes the ProSe discovery terminal identifier, the indicator, and the target ProSe discovery terminal identifier.

In step 1209, the ProSe function entity in another network sends back a discovery response message to the ProSe function entity in the home network, and the discovery response message includes parameters such as a ProSe query code, a discovery filter, a ProSe query key, a ProSe response code, a ProSe response key.

In step 1210, the ProSe function entity in the home network sends a broadcast authentication message to a ProSe function entity in a visited network in which the active terminal currently registers, and the message includes parameters such as a ProSe application identifier, the ProSe query code, the terminal identifier.

In step 1211, the ProSe function entity in the visited network sends back a broadcast authentication response message to the ProSe function entity in the home network.

In step 1212, the ProSe function entity in the home network sends back a discovery response message to the active terminal, and the discovery response message includes parameters such as the mode (the value of which is set to B), the discovery filter, the ProSe query code, the ProSe query key, a current time, a maximum offset value, and a validity period.

In step 1213, the active terminal configures the radio resource.

Figure 19:
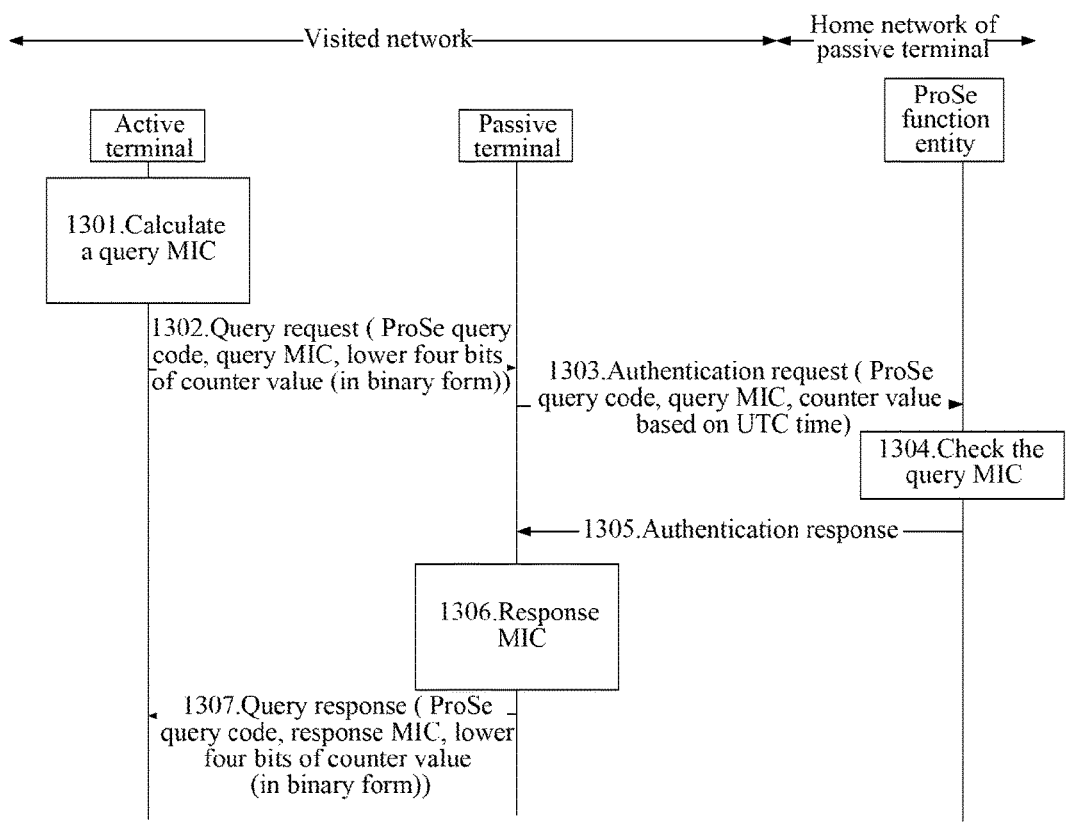
FIG. 19 is a specific flow chart of a query process according to an embodiment of the present disclosure.

An implementation flow of a query process is as shown in FIG. 19.

In step 1301, an active terminal calculates a query MIC.

Herein, the query MIC is calculated by using a signature algorithm, that is, HMAC-SHA-256, that is, MIC=HMAC-SHA-256 (ProSe query key, string S), the string is formed by S=FC∥P0∥L0∥P1∥L1∥P2∥L2, herein, FC is an algorithm type with a fixed length, P0 is the message type (the value of which is set to PC5_DISCOVERY), L0 is the length of the message type, P1 is the ProSe query code, L1 is the length of the ProSe query code, P2 is the counter value based on UTC time, L2 is the length of the counter value.

In step 1302, the active terminal sends a query request message to a passive terminal, and the query request message includes parameters such as a ProSe query code, a query MIC, the lower four bits of the counter value (in binary form).

In step 1303, the passive terminal sends an authentication request message to a ProSe function entity in a home network of the passive terminal, and the authentication request message includes the ProSe query code, the query MIC, and a counter value based on UTC time.

In step 1304, the ProSe function entity in the home network of the passive terminal checks the query MIC.

In step 1305, the ProSe function entity in the home network of the passive terminal sends back an authentication response message to the passive terminal.

In step 1306, the passive terminal calculates a response MIC.

Herein, the response MIC is calculated by using a signature algorithm, that is, HMAC-SHA-256, that is, MIC=HMAC-SHA-256 (ProSe response key, string S), the string is formed by S=FC∥P0∥L0∥P1∥L1∥P2∥L2, herein, FC is an algorithm type with a fixed length, P0 is the message type (the value of which is set to PC5_DISCOVERY), L0 is the length of the message type, P1 is the ProSe response code, L1 is the length of the ProSe response code, P2 is the counter value based on UTC time, L2 is the length of the counter value.

In step 1307, the passive terminal checks the ProSe query code, and if the ProSe query code is successfully checked, the passive terminal sends a query request message to the active terminal, and the query request includes parameters such as the ProSe query code, the response MIC, the lower four bits of the counter value (in binary form).

Figure 20:
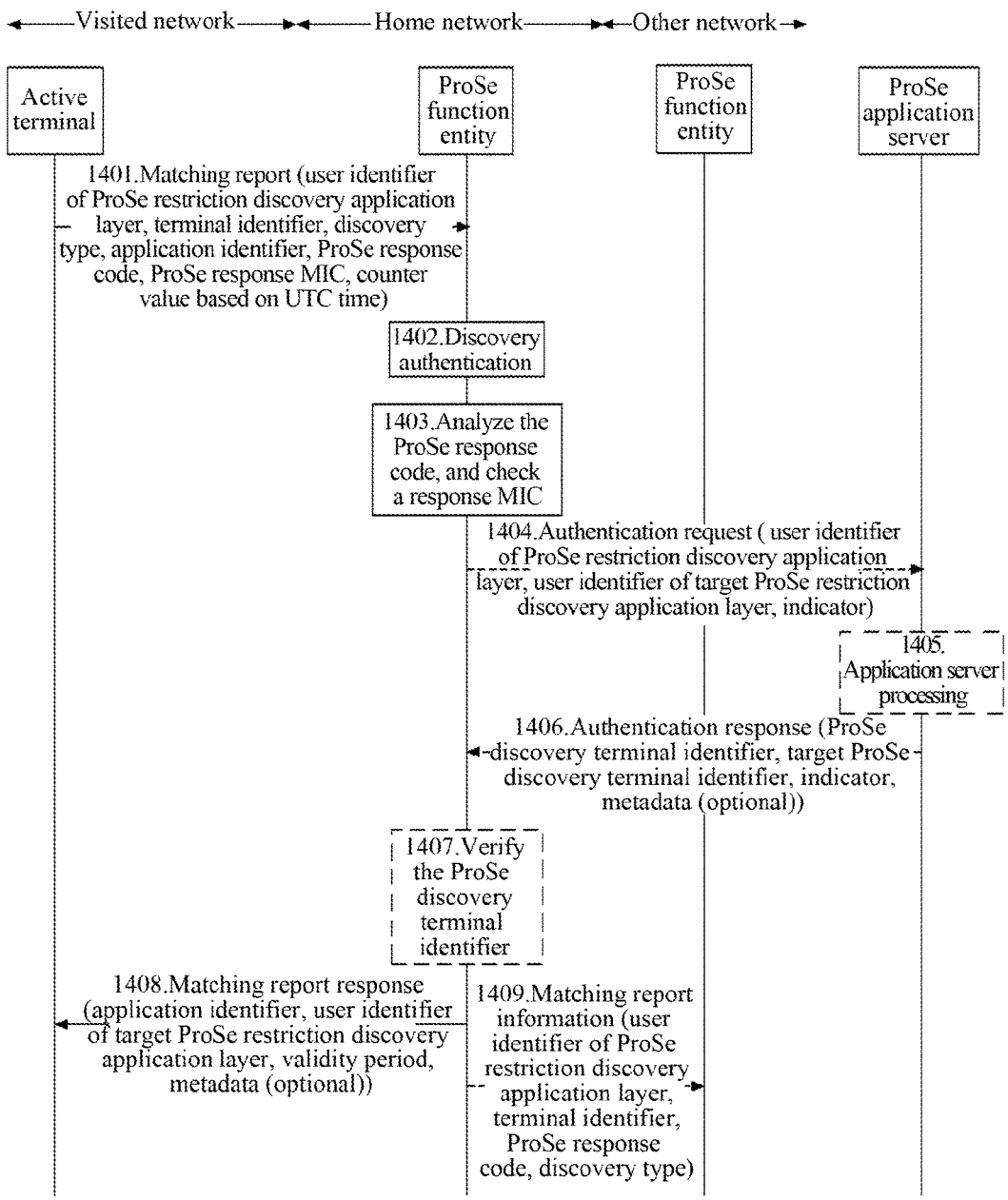
FIG. 20 is a specific flow chart of a matching process according to an embodiment of the present disclosure.

An implementation flow of a matching process is as shown in FIG. 20.

In step 1401, an active terminal sends a matching report message to a ProSe function entity in a home network of the active terminal, and the matching report message includes parameters such as a user identifier of a ProSe restriction discovery application layer, a terminal identifier, a discovery type, an application identifier, a ProSe response code, a ProSe response MIC, a counter value based on UTC time.

In step 1402, the ProSe function entity in the home network performs discovery authentication.

In step 1403, the ProSe function entity in the home network analyzes the ProSe response code, and checks a response MIC.

In step 1404, the ProSe function entity in the home network sends an authentication request message to the ProSe application server, and the authentication request message includes parameters such as the user identifier of the ProSe restriction discovery application layer, the user identifier of the target ProSe restriction discovery application layer, an indicator.

In step 1405, the ProSe application server performs processing.

In step 1406, the ProSe application server sends back an authentication response message to the ProSe function entity in the home network, and the authentication response message includes parameters such as a ProSe discovery terminal identifier, a target ProSe discovery terminal identifier, an indicator. In an implementation mode, the authentication response message may further include metadata parameter.

In step 1407, the ProSe function entity in the home network verifies the ProSe discovery terminal identifier.

In step 1408, the ProSe function entity in the home network sends back a matching report response message to the active terminal, and the matching report response message includes parameters such as the application identifier, the user identifier of the target ProSe restriction discovery application layer, the validity period. In an implementation mode, the matching report response message may further include metadata parameter.

In step 1409, the ProSe function entity in the home network sends a matching report information message to a ProSe function entity in another network, and the matching report information message includes parameters such as the user identifier of the ProSe restriction discovery application layer, the terminal identifier, the ProSe response code, the discovery type.

The request receiving module and the response sending-back module of the ProSe function entity in the home network of the passive terminal, which are provided in the embodiments of the present disclosure, may be implemented by a processor of the ProSe function entity in the home network of the passive terminal; the first receiving module and the first sending module of the ProSe function module in the home network of the active terminal, which are provided in the embodiments of the present disclosure, may be implemented by a processor of the ProSe function entity in the home network of the active terminal; the second sending module and the second receiving module of the active terminal, which are provided in the embodiments of the present disclosure, may be implemented by a processor of the active terminal; the third receiving module, the third sending module, and the fourth sending module of the passive terminal, which are provided in the embodiments of the present disclosure, may be implemented by a processor of the passive terminal.

Of course, functions done by the above-mentioned processors may be implemented by a specific logical circuit as well; in a specific embodiment, the processors may be Central Processing Units (CPUs), Microprocessor Units (MPUs), Digital Signal Processors (DSPs), or Field Programmable Gate Arrays (FPGAs), and so on.

It should be illustrated that, in the embodiments of the present disclosure, if the above-mentioned security methods for D2D mode B discovery are implemented in a form of software function modules and are sold or used as an independent product, the methods may also be stored in a computer readable storage medium. Based on such understanding, the technical scheme of the embodiments of the present disclosure substantially or the portions which make contributions to the existing technology may be reflected in the form of software product, the computer software product is stored in a storage medium and includes multiple instructions which enable a computer device (which may be a personal computer, a server or a network device) to execute all or partial steps of the method provided by each embodiment of the present disclosure. And the above mentioned storage medium includes various mediums such as USB flash disk, mobile disk, Read-Only Memory (ROM), magnetic disk or compact disk which can store program codes. Therefore, the embodiments of the present disclosure are not limited to any specific combination of the hardware and software.

Correspondingly, an embodiment of the present disclosure further provides a computer storage medium which stores a computer program, herein, the computer program is used to execute the security methods for D2D mode B discovery in the embodiments of the present disclosure.

The embodiments described above are just preferred embodiments of the present disclosure and are not used for limiting the scope of the present disclosure. Any modifications, equivalent substitutions and improvements made within the essence and principle of the present disclosure should be included in the scope of the present disclosure.

INDUSTRIAL APPLICABILITY

In four processes of the D2D mode B discovery service in the embodiments of the present disclosure, integrity protection is performed, by adding corresponding parameters, on a discovery response message of a passive terminal, a discovery response message of an active terminal, a query request message sent by the active terminal to the passive terminal, a query response message sent by the passive terminal to the active terminal, and the matching report message of the active terminal; thus, in four processes of the D2D mode B discovery service, integrity protection is performed on a discovery response message of a passive terminal, a discovery response message of an active terminal, a query request message sent by the active terminal to the passive terminal, a query response message sent by the passive terminal to the active terminal, and the matching report message of the active terminal, and a threat of replay attack by an attacker is prevented.

What is claimed is:

1. A security method for D2D mode B discovery, comprising:
   an active terminal calculating a query message integrity protection code, MIC, sending a ProSe query code, the query MIC, and a time calibration value, to a passive terminal;
   the active terminal receiving a ProSe response code and a response MIC which are sent back from the passive terminal.

2. The security method according to claim 1, wherein, the active terminal calculating the query MIC, comprises: the active terminal using Hash-based Message Authentication Code—Secure Hash Algorithm, HMAC-SHA-256, to calculate the query MIC, that is, MIC=HMAC-SHA-256, ProSe query key, string S, the string is formed by S=FC||P0||L0||P1||L1||P2||L2, wherein, FC is an algorithm type with a fixed length, P0 is a message type, of which a value is set to PC5_DISCOVERY, L0 is a length of the message type, P1 is the ProSe query code, L1 is a length of the ProSe query code, P2 is a counter value based on Universal Time Coordinated, UTC time, and L2 is a length of the counter value.

3. The security method according to claim 1, wherein:
   a ProSe function entity in a home network of the active terminal receiving the ProSe query code, a ProSe query key, the ProSe response code, and a ProSe response key, which are sent back from a ProSe function entity in another network;
   the ProSe function entity in the home network of the active terminal sending back the ProSe query code and the ProSe query key to the active terminal.

4. The security method according to claim 3, wherein, the ProSe function entity in the home network of the active terminal receiving the ProSe query code, the ProSe query key, the ProSe response code, and the ProSe response key, which are sent back from the ProSe function entity in another network, comprises: the ProSe function entity in the home network of active terminal receiving a first discovery response message sent back from the ProSe function entity in another network, and the first discovery response message comprises the ProSe query code, the ProSe query key, the ProSe response code, and the ProSe response key.

5. The security method according to claim 3, wherein, the discovery response message further comprises the ProSe query code and a discovery filter.

6. The security method according to claim 3, wherein, the ProSe function entity in the home network of the active terminal sending back the ProSe query code, the ProSe query key, a current time, and a maximum offset value, to the active terminal, comprises: after performing broadcast authentication with a ProSe function entity in a visited network in which the active terminal currently registers, the ProSe function entity in the home network of the active terminal sending back a second discovery response message to the active terminal, and the second discovery response message comprises the ProSe query code, the ProSe query key, the current time, and the maximum offset value.

7. The security method according to claim 6, wherein, the second discovery response message further comprises a current time and a maximum offset value.

8. The security method according to claim 6, wherein, the second discovery response message further comprises a mode, a discovery filter and a validity period.

9. A security method for D2D mode B discovery, comprising:
   a passive terminal receiving a ProSe query code, a query MIC, and a time calibration value, which are sent by an active terminal;
   the passive terminal sending the ProSe query code, the query MIC, and a counter value based on UTC time, to a ProSe function entity in a home network of the passive terminal, and the ProSe function entity in the home network of the passive terminal checking the query MIC;
   the passive terminal calculating a response MIC, and sending back a ProSe response code and the response MIC to the active terminal.

10. The security method according to claim 9, wherein, the passive terminal calculating the response MIC, comprises: the passive terminal using HMAC-SHA-256 to calculate the response MIC, that is, MIC=HMAC-SHA-256, ProSe response key, string S, the string is formed by S=FC∥P0∥L0∥P1∥L1∥P2∥L2, wherein, FC is an algorithm type with a fixed length, P0 is a message type, of which a value is set to PC5_DISCOVERY, L0 is a length of the message type, P1 is the ProSe response code, L1 is a length of the ProSe response code, P2 is the counter value based on UTC time, and L2 is a length of the counter value.

11. The security method according to claim 9, wherein:
a Proximity-based Service, ProSe, function entity in a home network of the passive terminal sending back the ProSe response code, a ProSe response key to the passive terminal;
the passive terminal receiving the ProSe response code and the ProSe response key.

12. The security method according to claim 11, wherein, the ProSe function entity in the home network of the passive terminal sending back the ProSe response code and the ProSe response key, comprises: the ProSe function entity in the home network of the passive terminal receiving a discovery request message of the passive terminal, performing authentication processing on the passive terminal, and sending a discovery response message to the passive terminal, wherein, the discovery response message comprises the ProSe response code and the ProSe response key.

13. The security method according to claim 12, wherein, the discovery response message further comprises a current time and a maximum offset value.

14. The security method according to claim 13, wherein, the discovery response message further comprises a mode, a discovery filter and a validity period.

15. A non-transitory computer storage medium, storing computer-executable instructions, wherein, the computer-executable instructions are used to execute the security method for D2D mode B discovery according to claim 1.

16. A non-transitory computer storage medium, storing computer-executable instructions, wherein, the computer-executable instructions are used to execute the security method for D2D mode B discovery according to claim 9.

* * * * *